United States Patent [19]
Ryrko et al.

[11] Patent Number: 5,959,206
[45] Date of Patent: Sep. 28, 1999

[54] MICROMECHANICAL ROTATION SPEED SENSOR

[75] Inventors: Bruno F. Ryrko, Reute; Eberhard Handrich, Kirchzarten; Uwe Breng, Gundelfingen; Martin Hafen, Rottweil, all of Germany

[73] Assignee: Litef GmbH, Germany

[21] Appl. No.: 08/952,756

[22] PCT Filed: May 30, 1996

[86] PCT No.: PCT/EP96/02333

§ 371 Date: Nov. 18, 1997

§ 102(e) Date: Nov. 18, 1997

[87] PCT Pub. No.: WO96/38710

PCT Pub. Date: Dec. 5, 1996

[30] Foreign Application Priority Data

May 31, 1995 [DE] Germany .......................... 195 20 051

[51] Int. Cl.[6] ................................................. G01C 19/00
[52] U.S. Cl. ......................................................... 73/504.12
[58] Field of Search ........................... 73/502.02, 503.03, 73/504.04, 504.12, 504.14, 504.15, 504.16, 510

[56] References Cited

U.S. PATENT DOCUMENTS

| | | | |
|---|---|---|---|
| 3,744,322 | 7/1973 | Pacey et al. .................. | 73/504.12 |
| 5,285,686 | 2/1994 | Peters ........................... | 73/504.15 |
| 5,396,798 | 3/1995 | Frische ......................... | 73/514.15 |
| 5,438,870 | 8/1995 | Zabler et al. .................. | 73/504.02 |

FOREIGN PATENT DOCUMENTS

| | | |
|---|---|---|
| 0636860 | 2/1995 | European Pat. Off. . |
| WO 9208140 | 5/1992 | WIPO . |

*Primary Examiner*—Hezron Williams
*Assistant Examiner*—Richard A. Moller
*Attorney, Agent, or Firm*—Elliott N. Kramsky

[57] ABSTRACT

A micromechanical rate-of-rotation sensor based on the coriolis principle includes two plate-like oscillators electrostatically driven to oscillate out-of-phase. The oscillators are arranged one above another in alignment to oscillate via plate-like support structures separated from one another by a very small drive capacitor gap. By suitable selection of the natural frequency of the support structure parts, due to a significantly-larger distance between the oscillators, it is possible to achieve larger amplitudes of oscillation and, hence, a high oscillation quality, unlimited by the drive capacitor gap (which is narrow for reasons of good stimulation at small excitation voltages). The two oscillator structures in each case preferably comprise two electrically mutually insulated bonded parts suspended via springs within a frame and configured so that essentially only rotational oscillator movements are possible with linear movements of the oscillators in the ±z spatial direction largely suppressed.

20 Claims, 5 Drawing Sheets

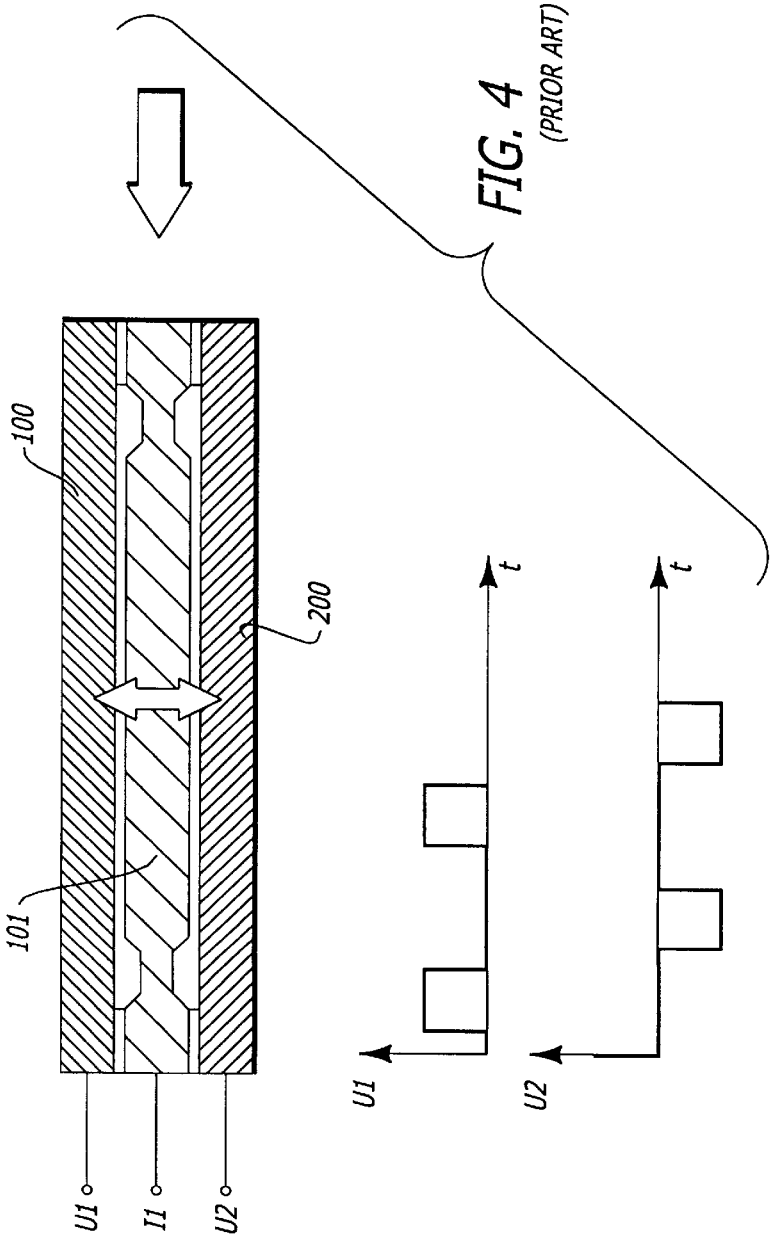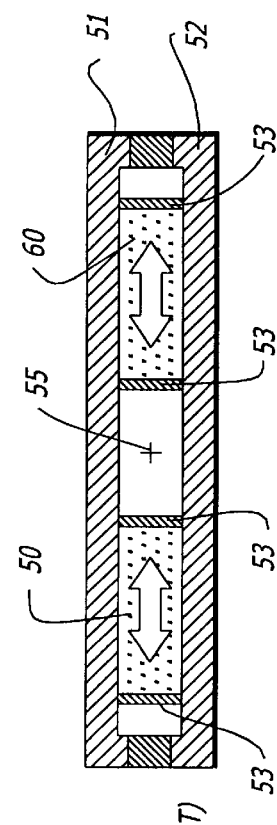
FIG. 4 (PRIOR ART)
FIG. 5 (PRIOR ART)

MICROMECHANICAL ROTATION SPEED SENSOR

BACKGROUND

1. Field of the Invention

The present invention relates to micromechanical rate-of-rotation sensors based upon the Coriolis principle. More particularly, the invention pertains to a sensor including two electrostatically stimulated plate-like oscillators that oscillate out-of-phase.

2. Description of the Prior Art

The measurement of rotation rates by Coriolis forces is known and used in numerous sensors. The coriolis rate-of-rotation sensors currently available on the market make use of piezoelectric effects, for example, for driving oscillations and for readout. See, for example, EP 0 563 761 A1, EP 0 563 762 A1, EP 0 520 467 A1, EP 0 520 468 A2, EP 0 533 163 A2, EP 0 460 089 B1, GB 2 251 072 A, CA 1 313 065 A, EP 0 298 511 B1, EP 0 318 972 B1, EP 0 638 783 A1 and U.S. Pat. No. 5,247,252.

As the piezoelectric materials employed in microengineering for the above purposes have temperature-dependent material parameters which differ significantly from silicon, high temperature dependencies and non-reproducibilities of the zero point of such rotation rate sensors result that severely restrict their fields of application.

Rotation rate sensors with micromechanical elements are available. On the other hand, purely micromechanical solutions for a compact sensor are not as yet on the market. However, micromechanical solutions in which coriolis accelerations are measured are known from patent publications see, for example, U.S. Pat. No. 5,101,702, CH 682 844 A5, GB 2 251 688 A, DE 40 22 495 A1, EP 0 574 143 A1, EP 0 634 629 A1, U.S. Pat. No. 5,203,208, EP 0 442 280 A2, U.S. Pat. No. 4,750,364, EP 0 623 807 A, EP 0 620 415 A1, GB 2 276 241 A, U.S. Pat. No. 4,884,446 and DE 40 41 582 A1.

Capacitive actuators are suggested for driving capacitive bridge circuits for readout of oscillating structures in a micromechanical design of silicon technology. Note, for example, GB 92 009 30, EP 0 586 437 A1, U.S. Pat. No. 5,207,685, DE 40 41 582 A1.

The most effective force direction for the capacitive drive of an oscillating micromechanical structure is the vertical one between two opposed, oppositely polarized plates. For this reason it is expedient, for such an oscillating structure, to select an arrangement in which (referring to FIG. 4 of this application) two oppositely-polarized plates 100 and 200, respectively, can be employed to drive the oscillator 101. The schematic signal diagrams beneath the cross-sectional illustration of the oscillator clarify the phases of the excitation signals applied to the upper 100 (electrode 1) and the lower plate 200 (electrode 2) respectively.

If very small distances should exist between the two drive capacitor surfaces between the upper plate 100 and the oscillator 101 and between the lower plate 200 and the oscillator 101, then sufficiently large driving forces may be obtained with comparatively small voltages (e.g. 5 V). The disadvantage of such arrangement, known in principle, according to FIG. 4 (cf., for example, U.S. Pat. No. 4,884,446), is that the small distances between the drive capacitor surfaces simultaneously restrict the maximum oscillation amplitude of the oscillator 101 to a fraction of the capacitor plate spacings. For small oscillator attenuations, very strict requirements must be imposed upon the gas atmosphere within which the oscillator arrangement is located.

Under the influence of coriolis acceleration, a deflection orthogonal to the plane of oscillation is generated and can be used to measure rotation rate. In the example of FIG. 4, the indicated rotation rate generates coriolis forces that point out of the plane of the figure. However, this arrangement has the disadvantage that the reaction forces to the oscillator movement are introduced into the environment of the sensor, and can bring about interference with the measured values.

Double oscillator arrangements as shown by FIG. 5 (cf. also GB 2 251 688 A) have been proposed to avoid this. The first oscillator 50 and the second oscillator 60 move out-of-phase. A rate of rotation whose vector is perpendicular to the plane of the frame produces torques about this common axis of rotation 55 at the oscillation frequency. Employing this known arrangement, it is possible to achieve large oscillator amplitudes. However, this arrangement has the disadvantage that, given capacitive drive via differential capacitors, the driving forces act between surfaces located perpendicular to the plane of the wafer and with small separations exactly parallel to one another produced only with difficulty. Non-uniform air gaps at the oscillators 50, 60 provide a stimulus about the axis of rotation and influence the zero point of the sensor considerably. This effect is temperature-dependent. A further disadvantage of this arrangement with capacitive stimulation consists of the relatively small driving forces. Attempts are being made, according to more recent proposals, to reduce these by means of comb-like electrodes.

SUMMARY OF THE INVENTION

The present invention addresses the shortcomings of the prior art by providing an improvement in a micromechanical rate-of-rotation sensor of the type that is based on the coriolis principle and includes two plate-like oscillators driven electrostatically to oscillate out-of-phase. The improvement provided by the invention includes the two oscillators being arranged one above the other in two plane-like layers. Such oscillators are arranged to be driven to oscillate perpendicular to their plate-like planes.

The invention is a micromechanical rate-of-rotation sensor according to the coriolis principle in which interference with measured values resulting from reaction forces due to oscillator movements do not occur and in which, despite the desired small distances between drive capacitor surfaces, in theory no or significantly fewer restrictions with respect to permissible oscillator amplitude need be taken into account. The sensor can be produced cost-effectively using micromechanical engineering.

The solution according to the invention, in the case of a micromechanical rate-of-rotation sensor based on the coriolis principle with two plate-like oscillators electrostatically stimulated to oscillate out-of-phase resides in the fact that the oscillators can be produced from single-crystal wafers using micromechanical engineering and are arranged one above another in two planes, as layers, perpendicular to the plane of the wafer. The direction of oscillation is perpendicular to the plane of the plates. This allows cost-effective production using micromechanical processes, such as etching and wafer bonding.

According to the invention, the oscillators are connected at one side or at two opposite sides in each case to a part of the plate-like support structure. Through such structure, the electrostatic driving of oscillation is performed perpendicular to the plane of the wafer, the natural frequency of the support structure preferably being selected to be higher than that of the oscillators. Furthermore, the support structure parts are configured such that their reaction forces mutually cancel one another.

In order to permit greater oscillation amplitudes perpendicular to the plane of the wafer, the thickness of the oscillators running between the two parts of the support structure is distinctly lower than that of the support structure for driving oscillation. On the other hand, the thickness of the support structure is selected such that the smallest possible drive capacitor gaps result for the electrostatic stimulation of oscillation in the region of the support structure.

The oscillators are preferably connected in one piece to the parts of the support structure, in each case via at least one articulation strut of low thickness. This one-piece oscillator/support combination is, then, held on one side or two sides by in each case a spring strut in a frame surrounding the arrangement of oscillator and support structure. The spring strut is preferably configured as a leaf spring element or as an oblique spring element which essentially permits only rotational movements of the oscillator and suppresses linear deflection movements.

An advantageous implementation of such a micromechanical rate-of-rotation sensor consists in the oscillators, together with the parts connected thereto in one piece via the articulation struts of the support structure and of the frame, formed preferably by means of anisotropic etching from two layers of a wafer. The layers, for mutual insulation, are oxidized on respectively mutually facing surfaces and connected to one another by silicon fusion bonding to form a double oscillator structure. The double oscillator structures, arranged one above another in alignment, are hermetically sealed at the upper and lower side by nonconductive cover plates that are bonded to the frames. The oscillator structures are then located in the housing which is thus formed, in a vacuum or in an inert gas atmosphere under low pressure.

The preceding and other features and advantages of the present invention will become further apparent from the detailed description that follows. Such description is accompanied by a set of drawing figures. Numerals of the drawing figures correspond to those of the written description with like numerals referring to like features throughout both the written description and the drawing figures.

BRIEF DESCRIPTION OF THE DRAWINGS

FIG. 4 is a cross-sectional view of a plate oscillator structure in accordance with the prior art;

FIG. 5 is a cross-sectional view of a double oscillator structure in accordance with the prior art having oscillators arranged alongside one another in a single plane;

DETAILED DESCRIPTION OF THE PREFERRED EMBODIMENT

Figure 1:
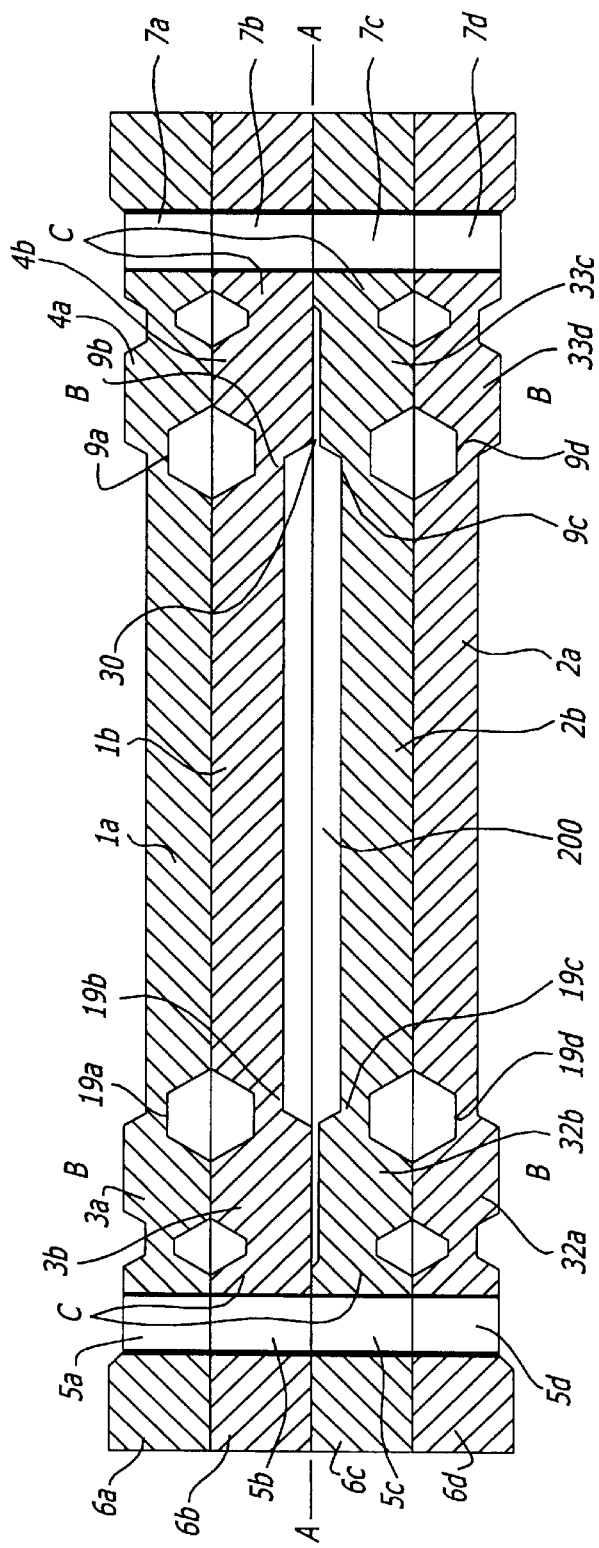
FIG. 1 is a cross-sectional representation of a double oscillator structure of a rate-of-rotation sensor according to the coriolis principle including features in accordance with the invention.

FIG. 1 shows firstly, in a sectional representation, the basic construction and arrangement of a two-layer oscillator structure for a micromechanical rotation rate sensor that utilizes coriolis forces to obtain a rate-of-rotation signal. In contrast to the prior art as illustrated in FIG. 5 (also GB 2 251 688 A) having two masses located alongside each other and oscillating out-of-phase, in the exemplary embodiment according to FIG. 1, the oppositely oscillating structures are not located alongside one another in a plane but rather above one another in different planes selected so that the reaction forces of the oscillator dynamics completely cancel each other.

Referring to FIG. 1, the oscillator arrangement has two oscillator elements 1a, 1b and 2a, 2b, respectively, each having two layers connected in each case at both sides via articulation struts 9a, 19a and 9b, 19b (and, with reference to the lower oscillator 2a, 2b via articulation struts 9c, 19c and 9d, 19d) in one piece to plate-like support parts 4a, 3a and 4b, 3b, on one side, and 33c, 33d and 32a, 32b on the other side. The support parts 3a, 3b and 4a, 4b (and, respectively, 32b, 32a and 33c, 33d) are connected via spring struts 5 (i.e. 5a, 5b, 5c and 5d) and 7 (i.e. 7a, 7b, 7c and 7d) to surrounding frame 6 (i.e. 6a, 6b, 6c, 6d) likewise in a single piece. The individual layers thus comprise (in relation to the uppermost layer in FIG. 1, for example) in one piece the frame 6a, connected via the spring strut 5a to the support part 3a. This, in turn, is connected via the articulation strut 19a to the oscillator element 1a. The oscillator element 1a merges at the right side via the articulation strut 9a into the right side support part 4a. Such support part 4a is, in turn, connected via the spring strut 7a to the right side part of the frame 6a. An oscillator structure of this type is produced from a wafer material (e.g. by means of an anisotropic etching process). The wafer plates between the individual layers of the two-layer double oscillator structure are oxidized (i.e. they are mutually electrically insulated) and then connected to each other by Si fusion bonding.

As FIG. 1 discloses, the distance between the upper oscillator 1a, 1b and the lower oscillator 2a, 2b is comparatively large, permitting large oscillation amplitudes. On the other hand, a drive capacitor gap 30 between the left side support parts 3a, 3b and 32b, 32a and between the right side support parts 4a, 4b and 33c, 33d is relatively small to permit good stimulation of oscillation with comparatively low pulse voltage levels. As mentioned above, the natural frequency of the support structure parts 3a, 3b and 4a, 4b and 32b, 32a and 33c, 33d, which are thick in comparison with the oscillator elements, is selected to differ from and, in particular, to be higher than, the natural frequency of the two oscillators 1a, 1b and 2a, 2b.

The spring struts 5a to 5d, 7a to 7d, that suspend or hold the two double oscillator structures in the frame 6 having the frame parts 6a to 6d are configured as leaf spring elements (seen better in FIG. 2) which are compliant for rotational movements about the y axis (A—A) and largely suppress linear movements in the +z and −z directions.

Figure 2:
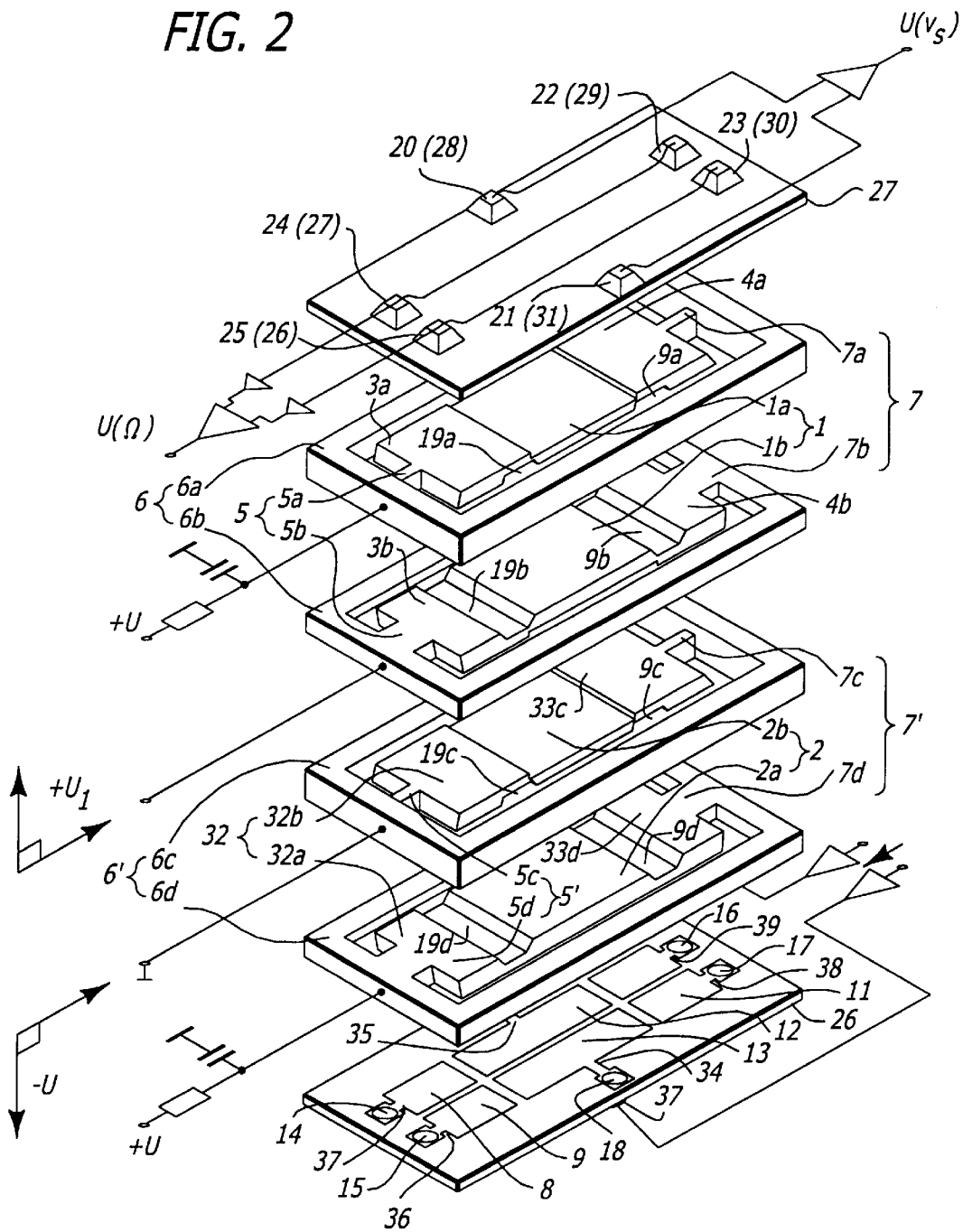
FIG. 2 is an exploded perspective view illustrating the layer construction of the double oscillator structure of FIG. 1 produced from a total of four wafer planes supplemented by an upper and a lower side cover plate.

As can be seen, in contrast to the known double oscillator arrangement of FIG. 5, the double oscillator according to FIGS. 1 and 2 is not stimulated directly but rather via the support structure 3a, 3b and 4a, 4b (and, respectively, 32b, 32a and 33c, 33d). Such support structure possesses greater rigidity than the oscillators 1a, 1b and 2a, 2b and allows only small movements at the resonant frequency of the oscillators, communicating this stimulus to the oscillators. The oscillators, as illustrated, possess a large distance or clearance 200 for building up a relatively-large oscillator amplitude. Since the oscillators 1a, 1b and 2a, 2b are not directly driven, the clearance 200 can be configured to be arbitrarily large in principle. This allows good stability for the oscillators at a high quality number. On the other hand, the capacitor gap 30 for the stimulation can be selected in the sub-micrometer range. As a result, adequately-large driving forces may be achieved even at small voltages. Given sufficiently low attenuation and suitable stimulation phase, the oscillator amplitude is summed over the drive amplitudes to form oscillator amplitudes that may lie orders of magnitude higher. The larger separation distance of the oscillators 1 and 2 from one another and from the surrounding components results in the high oscillation quality.

A special feature of the illustrated arrangement can also be observed in that the driving forces are not supported on a base structure from which they have to be transmitted to the oppositely-moving halves of the support structure 3, 4 and 32, 33 respectively. Rather, the driving forces are effectively exclusively-directly between the two respective halves of the support structure.

Since the two double-layer oscillators 1, 2 move in opposition, reaction forces are not transmitted to the environment. Conversely, transverse disturbances from the outside are effective in opposite senses on the two oscillators (as a result of the opposed oscillator movements) so that their influences mutually cancel one another in the output signal.

In the case of rotational movements of the entire sensor about the axis A—A, the two oscillators 1, 2 are moved in opposition out of their planes of oscillation. This results in a torque, synchronous with the oscillator movement, about the axis A—A, that is absorbed by the support structure. Since the support structure 3, 4, together with the oscillators 1, 2, is fastened in a frame, rotational movements in the region B of the support structure can be capacitively read out. In this case it is possible for the left half of the support structure 3a, 3b and 32a, 32b on the one side, and the right half of the support structure 4a, 4b and 33c, 33d on the other side to be read out separately. This makes possible either for compensation of effects of rotations about the axis orthogonal to the center of the figure in the signal and/or their measurement in the second channel.

In the example illustrated, the oscillators and the support structure are held by the above-mentioned parallel spring struts 5, 7 and 5', 7', configured as leaf springs, to increase the rotational stiffness about the axis orthogonal to the plane of the drawing. The leaf spring elements permit rotational movements of the oscillators about the y axis. Should the parts 1a and 1b and 2a and 2b of the two double oscillator structures be mutually insulated (as mentioned above, by means of oxide layers), then the potentials for driving and for reading out are electrically isolated. This results in considerable advantages for controlling speed, as well as for coupling in and design of the restoring and driving electronics.

Since the support structure in the region B (cf. FIG. 1) executes only very small movements, this results in the further advantage that, by means of the small drive capacitor gaps 30, great sensitivity can be achieved for reading out rotational movements.

The electrodes required for reading out the oscillator movements (i.e. the exciter oscillations) and those required for reading out the rotational movements in the region of the support structure (rate-of-rotation induced) may be applied as metal coatings on the respective inner side of the baseplate and cover plate 26 and 27 for sealing the oscillator structure.

In order to achieve the necessary low attenuation of the two oscillators, a negative pressure that is stable over the service life of the sensor must be maintained in the oscillator environment. The necessary tightness of the housing can be achieved by the anodically-bonded baseplate or cover plate 26 and 27 (fabricated of a nonconductive material, e.g. glass). The electrode connections are contacted through via apertures in the baseplate or cover plate and sealed off in a gas tight manner by bonded Si islands. This will be explained in greater detail below with reference to FIG. 2.

FIG. 2 is an exploded perspective view of a complete micromechanical rotation rate sensor according to the invention. The four central layer-like oscillator structures have already been explained by reference to FIG. 1. The upper oscillator 1 comprises the two parts 1a and 1b, oxidized for purposes of insulation on the mutual contact surfaces and firmly connected by Si fusion bonding (SFB). The oscillator 2, with its parts 2a and 2b, is of similar construction. The oscillators 1 and 2 are stimulated to oscillate out-of-phase.

The thicknesses of the articulation struts 9a, 9b and 19a, 19b, respectively and 9c, 9d and 19c, 19d, respectively, which form trench-like depressions, are appropriately selected to set a desired compliance.

The reading out of the transverse oscillator movements in the direction +z or −z is carried out via capacitor surfaces 12 and 13, constructed as metal coatings applied on the inner side to the two bondable insulating plates (i.e., the cover plate 27 and the baseplate 26) and connected via apertures in these insulation layers to bonded silicon islands 20, 21 and 28, 31. The through connection can be produced, just like the electrodes themselves, in the same operation by applying a conductive layer. FIG. 2 also reveals, in a schematic block circuit representation, the interconnection of such connections to speed control and to resetting electronics.

Figure 3:
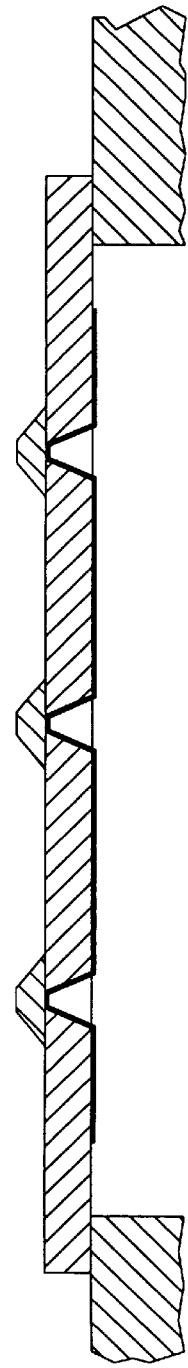
FIG. 3 is a basic cross-sectional representation of a cover plate for clarifying through-contact with electrodes applied to the inner surfaces.

In the same way, in the example illustrated in FIG. 2 (shown only for the baseplate 26) surface-like electrodes 8, 9 and 10, 11 are constructed for reading out the rotational movements induced by rotation rates transmitted from the oscillators 1 and 2 to the support structure parts 3a, 3b and 32a, 32b and 4a, 4b and 33c, 33d, respectively. Each of the electrodes is connected via a metallic conductor track 34, 35, 36, 37, 38 and 39 to a metallized cone-like or conical leadthrough 14, 15, 16, 17, 18. FIG. 3 illustrates an exemplary embodiment for this type of through contacting. The conical apertures are sealed in each case to the outside by an anodically bonded, conductive silicon island, which hermetically seals the sensor above and below. The conductive silicon islands form or are provided with contact platelets 20, 21, 22, 23, 24 and 25. The baseplate 26 and the cover plate 27 are anodically bonded to frames 6, 6'. Identical cover plates may be employed. Electrical contact may be made with the electrode layers via the silicon islands or the contact platelets 20 to 25.

FIG. 2 also reveals, in a schematic design, how the two double oscillators are electrically connected and driven. For example, the upper part oscillator 1a can be connected via the frame to a constant potential $+U_{const}$. Exciter pulses $+U_{exc}$ are applied to the second part oscillator 1b from drive electronics. The upper part 2b of the second double oscillator may be at fixed potential as illustrated (e.g. ground), or have applied to it appropriate negative pulses $-U_{exc}$ by the drive electronics.

In the exemplary illustrated embodiment, the readout electrode for oscillator movement has been divided into the electrodes 8 and 9 (or 10 and 11). As a result, it is possible to design the capacitive readout symmetrically and to suppress irradiation to a large extent.

Figure 6:
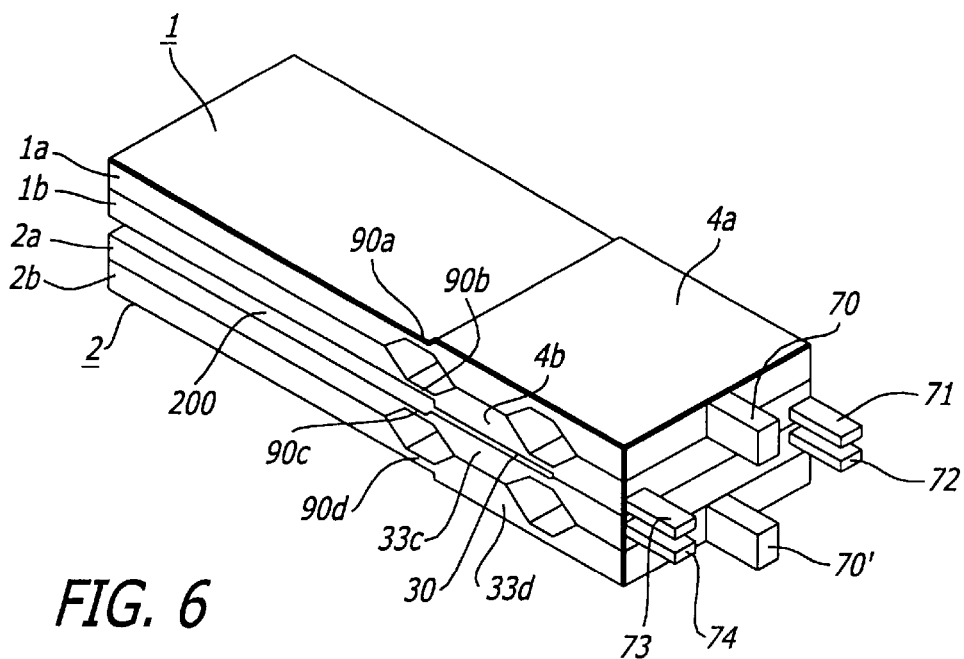
FIG. 6 is a partial perspective view of a double oscillator structure articulated at one side having features according to the invention.

FIG. 6 illustrates a first exemplary embodiment of a double oscillator structure which, in principle, is constructed in exactly the same way as that of FIG. 1, differing insofar as the oscillators 1 and 2, comprising two layers in each case, are stimulated only via a single narrow capacitor drive gap 30. In each case only one articulation strut 90a to 90d and one support part 4a, 4d and 33c, 33d is provided for each oscillator element 1a, 1b and 2a, 2b. Furthermore, one spring strut 70 and 70', arranged centrally on the front side, via which the respective electrical connection can be made is provided for each oscillator element 1 and 2. In the intermediate planes, (i.e., in relation to the inner oscillator elements 1b and 2a), spring struts 71 to 74 are provided, each offset with respect to the centrally-arranged spring elements 70, 70'. A considerable increase in rigidity of the respective plane (wafer plane) of the oscillator elements 1a, 1b and 2a, 2b is achieved as a result of this offset arrangement of the spring struts 70, 70' and 71 to 74.

Figure 7:
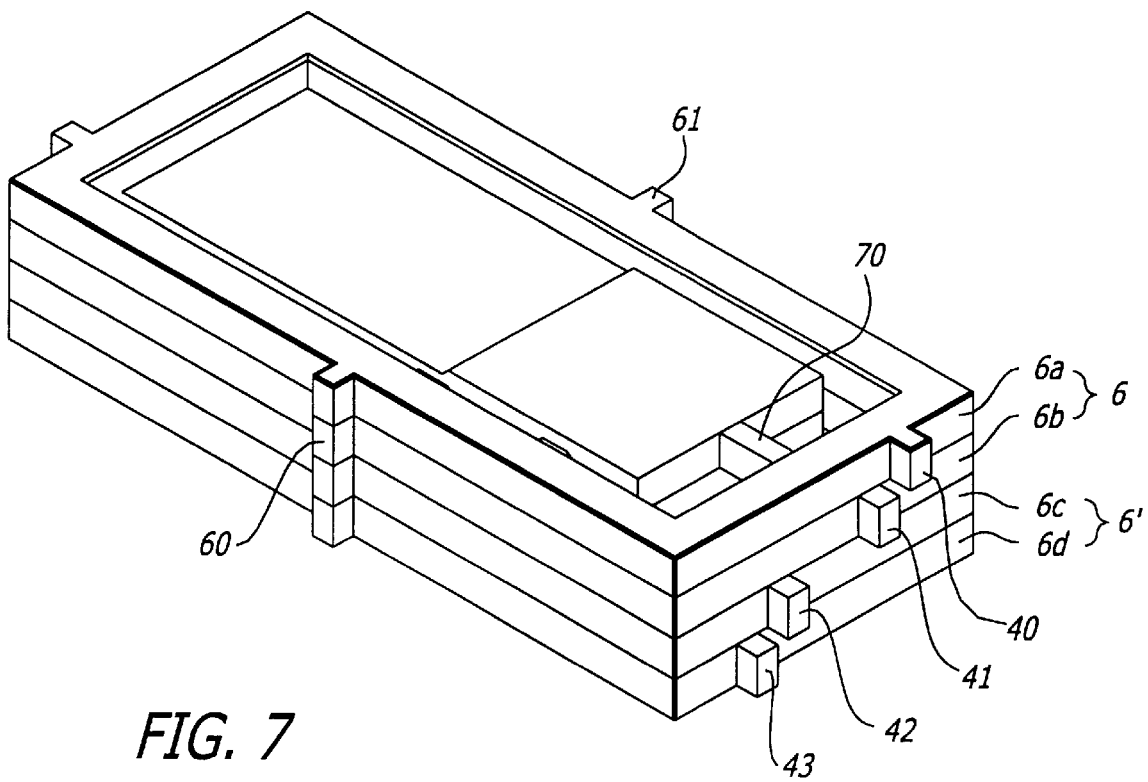
FIG. 7 is a perspective view of a double oscillator structure corresponding to FIG. 6, including a surrounding frame arrangement without upper and lower cover plates.

FIG. 7 illustrates the configuration, modified with respect to the embodiments first described, or the frame structure 6, 6'. Mutually aligning mounting attachments 60 are integrally molded on the center of the long side while side contacts 40, 41, 42 and 43, offset in relation to one another, are constructed on one or both narrow sides of the frames.

Figure 8:
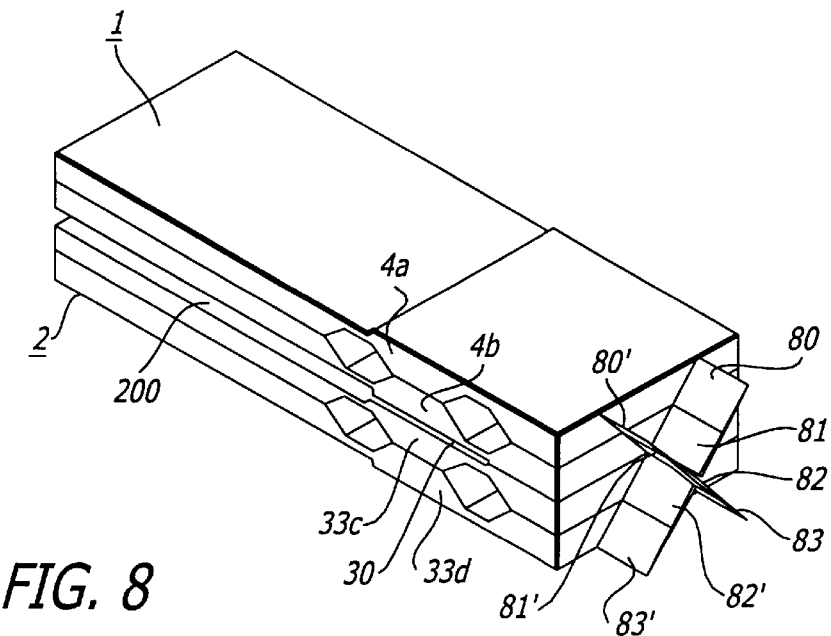
FIG. 8 is a perspective view of a double oscillator structure corresponding to FIG. 6 with one-sided articulation via articulation struts located in a [111] plane to form a type of crossed-spring articulation.

The embodiment according to FIG. 8 of the double-layer oscillator structure differs from that according to FIG. 6 by employing a different construction of spring struts 80 to 83 and 80' to 83'. Such spring struts are oblique on one side, align with one another and mutually cross. While the actual plate-like oscillator structure, articulated on one side, from the free,(left side) end to the front, articulation side front face consists of individual [100] Si wafers, the spring struts 80 to 83 and 80' to 83' are formed by anisotropic etching in the forward direction, that is to say from [111] planes. As FIG. 8 readily reveals, this results in a single crossed-spring articulation. As is obvious to those skilled in the art, the design form of an oscillator structure according to FIG. 8 offers some production advantages with, at the same time, an improvement in the rigidity in the planes of the wafers.

Figure 9:
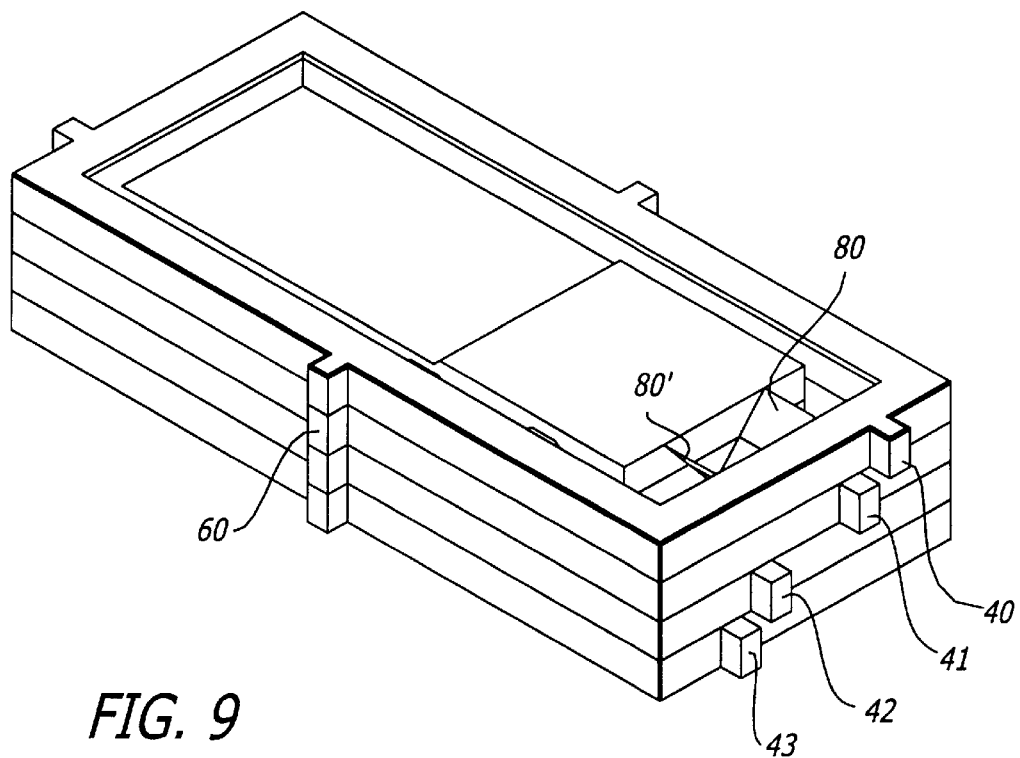
FIG. 9 is a perspective view of the double oscillator structure of FIG. 8 within a surrounding frame arrangement, once more without upper and lower cover plates.

Finally, FIG. 9 shows the finished layer construction of a micromechanical rate-of-rotation sensor according to the invention having an oscillator structure according to FIG. 8, but still without the cover plates 26 and 27. The frame structure corresponds to that of FIG. 7.

Employing the invention, a rotation rate sensor that can be completely fabricated with micromechanical engineering and is based on the coriolis principle is provided. In such a sensor, two oscillators are stimulated via support structures that are configured so that symmetry in constructional terms completely avoids the stimulation of structure resonances from external vibrations. This support structure accepts torques induced by rates of rotation from the oscillators with readout performed via a very narrow air gap that is far smaller than the transverse oscillator amplitudes.

By contrast with previously disclosed micromechanical rate-of-rotation sensors based on the coriolis principle, the stimulation of the oscillators 1, 2 is performed perpendicular to the respective plane of the wafer. The disadvantages of capacitive horizontal stimulation are thereby avoided while, due to a very narrow drive gap, comparatively large forces may be achieved with relatively small stimulation voltages. Furthermore, in contrast to known rotation rate sensors, it is not the movements, caused by coriolis accelerations, of the individual oscillators that are read out, such movements being superimposed upon the much larger stimulation oscillations. Rather, the effects of the coriolis accelerations of the two oscillators 1, 2 on the common support structure are capacitively detected. As a result, the reaction forces on the support structure of the individual part oscillators cancel one another to a large extent if not completed. The contradiction which arises, i.e. that the smallest possible gaps are needed for the capacitive driving and reading out, yet the largest possible gaps are needed for the movement of the part oscillators, is overcome, according to the invention, by seating the individual part oscillators on a common stimulation structure. This common stimulation structure enables small stimulation gaps 30, while a larger movement gap 200 is provided for the oscillators 1, 2.

While this invention has been disclosed with reference to its presently-preferred embodiment, it is not limited thereto. Rather, the invention is only limited insofar as it is defined by the following set of patent claims and includes within its scope all equivalents thereof.

What is claimed is:

1. In a micromechanical rate-of-rotation sensor of the type that is based on the coriolis principle and includes two plate-like oscillators driven electrostatically to oscillate out-of-phase, the improvement comprising, in combination:

a) said two oscillators being arranged one above the other in two plane-like layers; and b) said oscillators are arranged to be driven to oscillate perpendicular to their plate-like planes.

2. A rate-of-rotation sensor as recited in claim 1, characterized in that said oscillators are connected on two opposite sides in each case to a part of a plate-like support structure arranged one above another, via which said electrostatic driving of oscillation is performed.

3. A rate-of-rotation sensor as recited in claim 1, characterized in that said oscillators are connected on one side in each case to a part of a plate-like support structure arranged one above another, via which said electrostatic driving of oscillation is performed.

4. A rate-of-rotation sensor as recited in claim 2 characterized in that:

a) the natural frequency of said support structure is different from, and preferably higher than, that of said oscillators; and b) said support structure parts of each oscillator are configured so that their reaction forces mutually cancel one another.

5. A rate-of-rotation sensor as recited in claim 2 characterized in that the thickness of each oscillator extending out from said support structure is less than that of said support structure so that the possible amplitude of oscillation of each oscillator is significantly larger than the possible exciter amplitude, through said drive capacitor gap, for the electrostatic stimulation of oscillation in the region of said support structure.

6. A rate-of-rotation sensor as recited in claim 1 characterized in that each oscillator is connected on one piece to a support structure, via in each case at least one oscillation spring articulation strut of low thickness.

7. A rate-of-rotation sensor as recited in claim 6, characterized in that said support structure is secured on at least one side, in each case on the outer side facing away from said oscillator, via a spring strut, in a frame surrounding the arrangement of oscillator and support structure.

8. A rate-of-rotation sensor as recited in claim 7, characterized in that said individual spring struts comprise leaf spring elements for insuring rotational deflection movements of said oscillators and largely suppress linear movements of said oscillator.

9. A rate-of-rotation sensor as recited in claim 1 characterized in that said oscillators, together with parts connected in one piece thereto of a support structure, the spring struts and the frame, are formed by means of anisotropic etching from two layers of wafers which, for the purpose of insulation, are oxidized on the respectively mutually connected surfaces and are connected to one another by wafer bonding to form a double oscillator structure.

10. A rate-of-rotation sensor as recited in claim 9, characterized in that said wafers are [100] Si wafers.

11. A rate-of-rotation sensor as recited in claim 9, characterized in that said double oscillator structures, arranged one above another in alignment, is arranged, sealed off hermetically at the upper and lower side by cover plates bonded to said frames, inside the housing which is thus formed and which is evacuated or flooded with inert gas under low pressure.

12. A rate-of-rotation sensor as recited in claim 11, characterized in that said cover plates consist of glass and are connected in a hermetically sealed manner by anodic bonding along said frames.

13. A rate-of-rotation sensor as recited in claim 11 characterized in that said cover plates are coated on the inside with flat metal fields which, on the one hand, are assigned to the two oscillators as oscillation reading out or resetting capacitor surfaces and, on the other hand, are assigned to the spaced-apart support structure parts as stimulation electrodes or for reading out movements induced by rates of rotation.

14. A rate-of-rotation sensor as recited in claim 13, characterized in that:

a) said metal fields can be contacted electrically via through-plated holes in said cover plates; and
b) said holes are closed on the outside by bonded on, conductive closure islands.

15. A rate-of-rotation sensor as recited in claim 14, characterized in that said conductive closure islands are formed by highly doped Si material and connected in a hermetically sealed manner to said cover plates by means of anodic bonding or Si fusion bonding.

16. A rate-of-rotation sensor as recited in claim 7 characterized in that:

a) said frames comprise a pair of frame parts that include at least on one outer side of the layer arrangement, attachments for electrical connection; and
b) said attachments are offset from wafer layer to wafer layer.

17. A rate-of-rotation sensor as recited in claim 7 characterized in that said frame parts are printed on two opposite sides with mounting attachments arranged one above another in alignment.

18. A rate-of-rotation sensor as recited in claim 7, characterized in that when said support structure is held on one side, apart from a spring strut assigned in each case to each oscillator, the said support structure is also provided with further holding and connecting struts arranged in an offset manner, for the purpose of connecting to the respective frame.

19. A rate-of-rotation sensor as recited in claim 10 characterized in that said spring struts are formed, by means of anisotropic etching, in planes of the respective wafer layer, as leaf spring struts arranged at an angle to the possible deflection directions.

20. A rate-of-rotation sensor as recited in claim 19, characterized in that each wafer layer is provided with two leaf spring struts of equal angular position opposed to an imaginary center line to produce a strut arrangement that mutually aligns and crosses itself from layer to layer and, as a whole, forms a crossed-spring articulation.

* * * * *